(12) United States Patent
Lambrecht (10) Patent No.: US 10,781,092 B2
(45) Date of Patent: Sep. 22, 2020

(54) DECANTER

(71) Applicant: Coravin, Inc., Burlington, MA (US)

(72) Inventor: Gregory Lambrecht, Natick, MA (US)

(73) Assignee: Coravin, Inc., Bedford, MA (US)

( * ) Notice: Subject to any disclaimer, the term of this patent is extended or adjusted under 35 U.S.C. 154(b) by 151 days.

(21) Appl. No.: 16/211,634

(22) Filed: Dec. 6, 2018

(65) Prior Publication Data

US 2019/0184346 A1 Jun. 20, 2019

Related U.S. Application Data

(60) Provisional application No. 62/598,491, filed on Dec. 14, 2017.

(51) Int. Cl.
| | | |
|---|---|---|
| B67D 3/00 | (2006.01) | |
| A47G 19/12 | (2006.01) | |
| B67D 1/00 | (2006.01) | |
| C12H 1/00 | (2006.01) | |
| B65D 81/24 | (2006.01) | |
| B01F 3/04 | (2006.01) | |

(52) U.S. Cl.
CPC ............ *B67D 3/007* (2013.01); *A47G 19/12* (2013.01); *B67D 1/0045* (2013.01); *B67D 3/0041* (2013.01); *C12H 1/00* (2013.01); *B01F 3/04787* (2013.01); *B01F 2215/0072* (2013.01); *B65D 81/245* (2013.01)

(58) Field of Classification Search
CPC .......................... B67D 3/007; B01F 3/04787
See application file for complete search history.

(56) References Cited

U.S. PATENT DOCUMENTS

| | | |
|---|---|---|
| 4,429,811 A | 2/1984 | Bakeman |
| 5,293,912 A | 3/1994 | Wildash et al. |
| 7,299,743 B2 | 11/2007 | Moore |
| 8,523,019 B2 | 9/2013 | Drobot et al. |
| 9,290,295 B2 | 3/2016 | Poggio |
| 9,938,131 B2 * | 4/2018 | Tomesch .............. B67D 3/0051 |
| 2007/0199615 A1 | 8/2007 | Larimer et al. |
| 2008/0170963 A1 | 7/2008 | Cantrell |
| 2016/0257554 A1 | 9/2016 | Manwani et al. |
| 2017/0101254 A1 | 4/2017 | Tomesch et al. |
| 2017/0158406 A1 | 6/2017 | Wengerd |
| 2017/0158485 A1 | 6/2017 | Lansberry et al. |
| 2017/0297886 A1 | 10/2017 | Van Der Weij |

FOREIGN PATENT DOCUMENTS

| | | |
|---|---|---|
| GB | 2 508 862 A | 6/2014 |
| WO | WO 2016/054839 A1 | 4/2016 |
| WO | WO 2017/014638 A1 | 1/2017 |

OTHER PUBLICATIONS

International Search Report and Written Opinion for International Application No. PCT/US2018/065092, dated Apr. 4, 2019.

* cited by examiner

*Primary Examiner* — Robert A Hopkins
(74) *Attorney, Agent, or Firm* — Wolf, Greenfield & Sacks, P.C.

(57) ABSTRACT

A decanter arranged to permit storage of wine or other beverage while isolated from ambient air and employing a variable size beverage storage volume. A valve may control flow past a piston as the piston is moved relative to a container to adjust a size of the beverage storage volume.

26 Claims, 7 Drawing Sheets

DECANTER

RELATED APPLICATION

This Application claims priority under 35 U.S.C. § 119(e) to U.S. Provisional Application Ser. No. 62/598491, entitled "DECANTER," filed Dec. 14, 2017, which is herein incorporated by reference in its entirety.

FIELD OF THE INVENTION

Wine comes in contact with air both as a result of opening of the wine bottle as well as during the process of pouring. Some exposure to air can help to release the wine's flavors as well as allow the "nose" or smell to develop. However, too much exposure to air can cause the wine to oxidize and become unpleasant.

Wine is often intentionally exposed to air using a decanter. Decanters are open containers, normally made from glass, that help aerate wine both during the process of pouring the wine into the decanter as well as by swirling the wine within the decanter or simply leaving the decanted wine open to air over time. However, if the wine remains in the decanter for prolonged periods, it can oxidize to an unwanted extent.

To prevent unwanted oxidation, some wine consumers will pour the decanted wine into smaller bottles, minimizing any air in the head space to minimize further oxidation during storage.

SUMMARY OF INVENTION

At least some aspects of the invention allow a user to open a bottle of wine, expose the wine to ambient air to suitably aerate the wine, and then enclose the wine in a storage volume such that the wine is no longer exposed to ambient air. Both aeration and storage may be performed using a same container. In addition, some embodiments allow a user to dispense wine from the storage volume in a way that avoids further exposure of the undispensed wine to air. This may provide a convenient way for a user to aerate a wine to a particular condition, and then effectively lock that condition into the wine, even over potentially prolonged storage periods, while permitting the wine to be dispensed in desired quantities and at separate times.

Accordingly, in some embodiments, a method of pouring and storing wine with minimal exposure to air or oxygen once the desired level of aeration is achieved is provided.

In some embodiments, a decanter enables the user to expose wine to air to achieve an optimal aeration, and then stop further oxidation by sealing or enclosing the wine in a beverage storage volume without further contact with air. The decanter may enable serving of wine from the decanter without exposing undispensed wine to air during the serving process. In some cases, the decanter uses a piston that fits within a container to both seal remaining wine for storage and transfer wine from the storage volume into a dispensing volume without exposing the remaining wine to air during the transfer and dispensing process.

In one embodiment, a decanter includes a container having an internal volume arranged to hold a beverage, e.g., the container may be a glass jar having a cylindrical shape and an open top into which wine may be poured and allowed to stand for exposure to ambient air. The decanter may also include a piston having a portion that is receivable in the internal volume of the container and movable relative to the container to define a beverage storage volume that is variable based on a position of the piston relative to the container. For example, the piston may be inserted into the container and then moved downwardly into the container to reduce the size of a space below the piston. This space below the piston and defined by both the piston and the container may be a storage volume where wine may be stored, e.g., for an hour, several hours, days, weeks, etc. A valve may be coupled to the piston and configured to control flow of fluid past the piston to or from the beverage storage volume. For example, the valve may include a one-way valve, two or more one-way valves (e.g., that control flow in opposite directions), a manually operated valve, an electrically operated valve, and others. The valve may be arranged to allow beverage to flow from the beverage storage volume through the valve for dispensing to a user's cup, e.g., so wine can be dispensed from the beverage storage volume, and then the storage volume resealed by the valve to allow remaining wine in the storage volume to be kept with little or no further exposure to air.

In one embodiment, the piston may be sealingly engaged with the container, e.g., by a close fit with the inner wall of the container or by a gasket positioned between the piston and container. The sealing engagement between the piston and the container may be maintained throughout a range of movement of the piston relative to the container. For example, the piston may be moved relative to the container to adjust a size of a beverage storage volume while sealing engagement between the piston and container is maintained. This may allow the piston to be moved to reduce the size of the storage volume, thereby driving air to exit the storage volume through the valve or other path. In one case, the container includes a cylindrical inner wall arranged to receive the portion of the piston and sealingly engage with the portion of the piston. For example, a seal (one or more o-rings) between the container and the piston may provide a fluid-tight sealing engagement between the piston and the container for a range of movement of the piston relative to the container. The seal may be arranged to move with the piston relative to the container.

In some embodiments, the piston may have a lower side that partially defines the beverage storage volume and the lower side of the piston may have a downwardly and outwardly flared shape. This configuration may help direct air or other gas in the beverage storage volume to move upwardly and toward the upper, smaller cross section portion of the flared shape. For example, the piston may include an opening that extends from the lower side of the piston to an upper side of the piston for fluid flow through the piston, and the opening may be located at an upper end of the downwardly and outwardly flared shape. Thus, as the piston is moved downwardly relative to the container, air in the storage volume may be directed toward the opening to pass through the piston and out of the storage volume. In some cases, the valve may include a gate that is arranged to sealingly engage with the piston so as to selectively open and close the opening for fluid flow. For example, the valve gate may include a disk, ball, or a frusto-conically shaped portion arranged to engage with the piston to sealingly close the opening.

Of course, the piston need not have a particular shape on its bottom or any other surface, and the piston may include an opening that extends from a lower side of the piston to an upper side of the piston for fluid flow through the piston. The valve may include a movable gate to open and close the opening, and the gate may be arranged to operate in any suitable way. For example, the gate may include a pivoting ball or disk, a disk that moves in a plane of the disk or perpendicular to the disk's plane to open and close the valve, a flexible flap or other portion that flexes and moves to open and close the valve, and others. In one embodiment, the valve includes a handle operable to move the movable gate relative to the piston to open and close the opening. For example, the handle may be threadedly engaged with the piston such that rotation of the handle relative to the piston moves the movable gate relative to the piston between open and closed positions. In other cases, the valve includes a resilient element that biases the movable gate and the handle to a closed position in which the opening is closed to fluid flow through the piston. The handle may be movable against a bias of the resilient element to move the movable gate to the open position, but the resilient element, such as a spring, may itself move the gate to the closed position when a user releases the handle.

In some embodiments, the piston and valve are arranged to allow movement of the piston relative to the container to reduce a size of the beverage storage volume and to force fluid flow out of the beverage storage volume through the valve in response to the movement of the piston relative to the container. For example, a user may push down on the piston relative to the container to move the piston downwardly, forcing fluid to flow upwardly past the piston and out of the beverage storage volume. In some embodiments, the piston and valve may be arranged to divide the internal volume of the container into the beverage storage volume on a first side of the piston (e.g., a lower side) and a dispensing volume on a second side of the piston opposite the first side (e.g., an upper side). In such cases, the piston and valve may be arranged to allow movement of the piston relative to the container to reduce a size of the beverage storage volume and to force fluid flow out of the beverage storage volume through the valve and into the dispensing volume in response to the movement of the piston relative to the container. With beverage located in the dispensing volume, the valve may be arranged to move to a closed position with beverage located in the dispensing volume, thereby enclosing remaining beverage in the storage volume. With the valve closed, the container, piston and valve may be arranged to allow pouring of the beverage from the dispensing volume and into a user's cup while the valve remains in the closed position and preventing fluid flow from, or into, the beverage storage volume. In some cases, the piston itself may define a cavity that defines the dispensing volume, whereas in other embodiments, the container and piston may define a dispensing volume.

As noted above, the container, piston and valve may be arranged to hold beverage in the beverage storage volume, and to allow movement of the piston relative to the container to reduce a size of the beverage storage volume so as to evacuate gas from the beverage storage volume. This may help minimize exposure of beverage in the storage volume to air or other gas. In some cases, the container, piston and valve may be arranged to evacuate gas from the beverage storage volume such that a volume of gas in the beverage storage volume is less than 5% of a volume of beverage in the beverage storage volume.

DETAILED DESCRIPTION

Embodiments are described below for serving and storing wine, e.g., after a desired level of aeration of the wine has been achieved. Some embodiments enable an optimum or other level of aeration to be "locked-in" the wine so that minimal further aeration occurs during subsequent storage, whether for an hour or less, or days, weeks or months. It should be understood, however, that embodiments in accordance with aspects of the invention are not limited to use with wine, but rather may be used with any suitable beverage, such as carbonated beverages, coffee, or other beverages that change character with exposure to ambient air.

Some embodiments use an open container into which an entire bottle of wine or other amount of beverage may be poured. Thereafter, a piston may be engaged with the container so as to enclose the wine in a beverage storage volume in the container. This beverage storage volume may be variable in size and/or shape depending on a position of the piston relative to the container. In some embodiments, the piston may be moved so as to reduce the size of the beverage storage volume to be the same as the volume of the beverage. Thus, air or other gas in the beverage storage volume may be removed from the beverage storage volume so that the wine or other beverage is minimally exposed to ambient air in the beverage storage volume. This may allow the wine to avoid further aeration or other change in characteristic due to exposure to air. Embodiments also allow wine or other beverage to be dispensed from the beverage storage volume while minimizing exposure of remaining beverage in the storage volume to ambient air.

Figure 1:
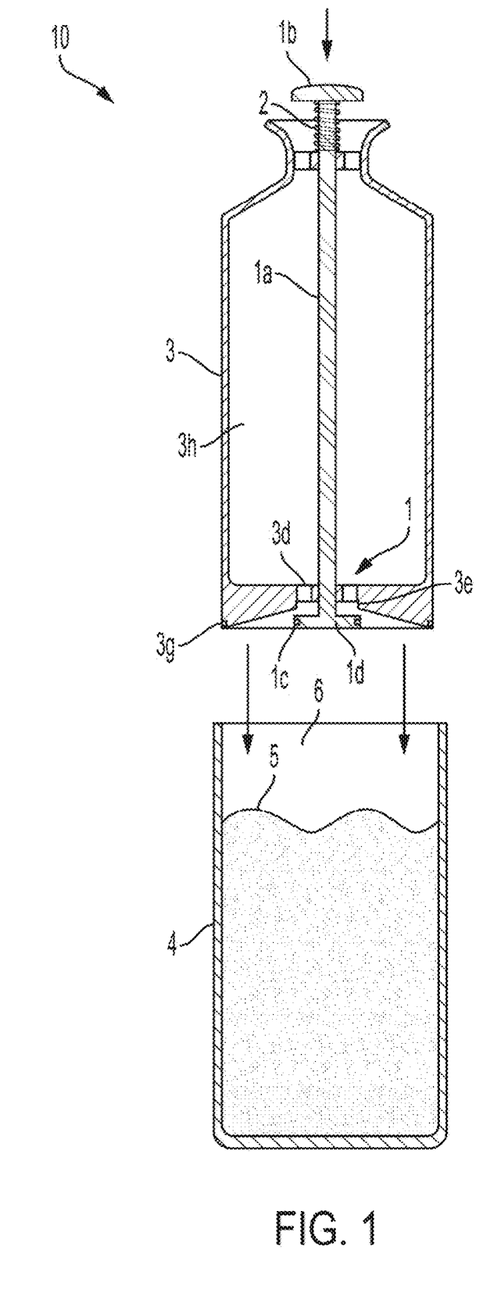
FIG. 1 shows a decanter in an illustrative embodiment.
Figure 2:
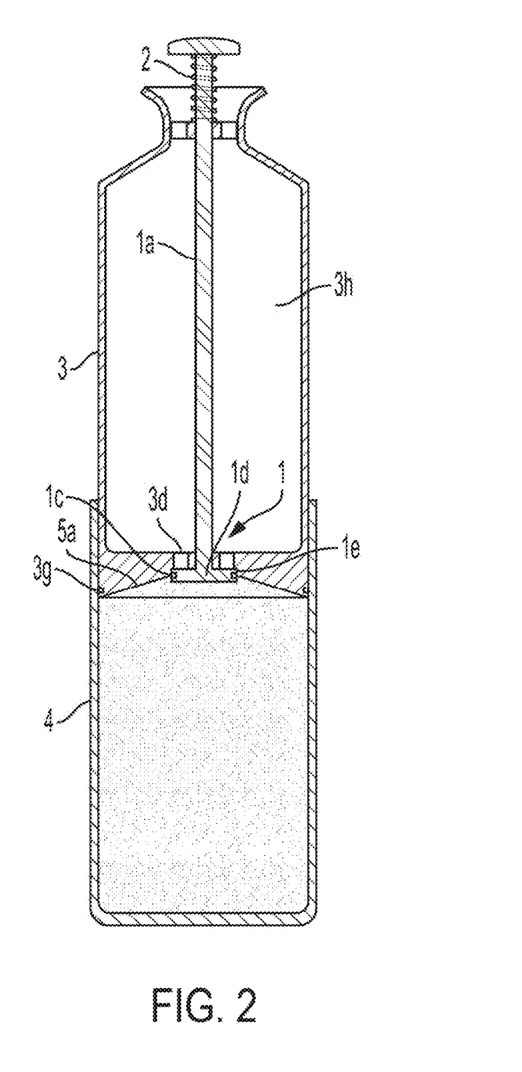
FIG. 2 shows the FIG. 1 embodiment with the piston inserted into the container.
Figure 3:
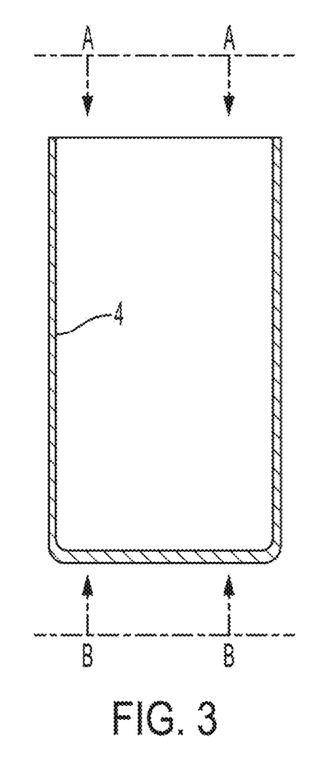
FIG. 3 shows a side view of the container in the FIG. 1 embodiment.
Figure 4:
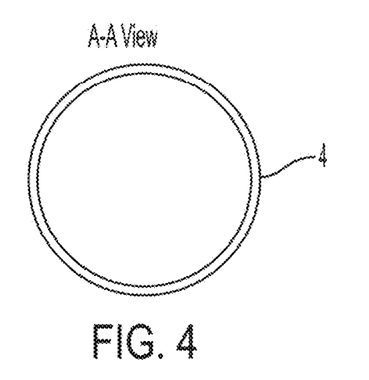
FIG. 4 shows a top view of the FIG. 3 container.
Figure 5:
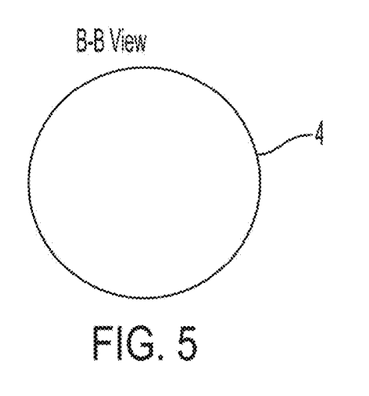
FIG. 5 shows a bottom view of the FIG. 3 container.

FIGS. 1 and 2 show an illustrative embodiment of a decanter 10 that incorporates one or more aspects of the invention. The decanter 10 includes a container 4 that can be made from any of a variety of different materials and may be in a variety of different forms. In this embodiment and as shown in more detail in FIGS. 3-5, the container 4 is a glass vessel having a cylindrical shape with a flat bottom, but any other suitable shape may be employed, such as a vessel with a square, rectangular, triangular, irregular, oval or other suitable cross sectional shape aside from circular. At least a portion of the inner wall of the container may be smooth for reasons discussed more below, but this is not required. The container 4 as depicted does not have a pouring spout, but in certain embodiments a spout at the top or upper rim of the container 4 may be provided to assist in a clean pour from one or more locations at the rim of the container 4. Alternative materials, designs, and colors could be used for the container 4 or other portions of the decanter 10. The container 4 or other portions of the decanter 10 could be made from any material that is food-safe for fluids containing alcohol. These include, among others, glass, various plastics and metals including polycarbonate, acetal, PTFE, ABS, stainless steel, PVC, and PET. The container 4 is preferably rigid in design, although could also be compressible, such as a sack or bellows structure. The container 4 or other portions of the decanter 10 could be clear, opaque, or colored with any of a variety of colors, e.g., to protect a beverage from UV or other wavelength light.

The container 4 in this embodiment has a volume that is more than an amount of wine intended to be managed by the decanter 10. For example, more than 750 ml is required to contain the average bottle of wine, but any size decanter 10 could be employed to hold larger or smaller amounts of wine. The container 4 could have markings on the interior or exterior along its side wall showing volume measurements to indicate the amount of wine within the container 4. Once wine is poured into the container 4, the user can leave the wine exposed to air until a desired amount of aeration is achieved. For some wines, this may require little or no time, while for others this may take hours. Alternately, or in addition, the wine may be aerated prior to and/or during dispensing the wine into the container 4. For example, the wine may be passed through an aeration device while being poured into the container 4, and/or may be held in a wide, flat bottomed container to expose a relatively large surface area of the wine to the air prior to being dispensed into the container 4. Once the optimal taste and smell of the wine has been achieved, the user can enclose the wine in a beverage storage volume within the decanter 10, as discussed below. Of course, if there is no desire to aerate the wine, or another beverage is held in the decanter 10, little or no aeration or other exposure to the ambient environment may be desired before enclosing the beverage in the decanter 10.

To enclose the wine or other beverage in a beverage storage volume of the decanter 10, a piston 3 may be positioned in the container 4 so the wine is contained in a space with relatively little or no air. For example, FIGS. 1 and 2 show a piston 3 being inserted into the inner space of the container 4. In this embodiment, the piston 3 fits into the container 4 to form a seal between the piston 3 and the inner wall of the container 4, e.g., with an air and/or liquid-tight seal. The piston 3 includes one or more o-rings 3g or other seals that creates a sliding seal between the piston 3 and the interior wall of the container 4, e.g., so a seal is maintained between the piston 3 and container 4 through a range of motion of the piston 3. However, other arrangements are possible to create a suitable seal, such as a close fit between a portion of the piston 3 and the container 4, one or more piston rings, a cup seal or gasket (e.g., as found in many bicycle pumps that provide a one-way seal action), a bellows or diaphragm seal (e.g., in which the bellows or diaphragm spans between the piston 3 and the rim of the container 4, allowing movement of the piston 3 into the container 4 while reducing a storage volume in the container 4 defined by the piston 3 and the container 4), and others.

Figure 6:
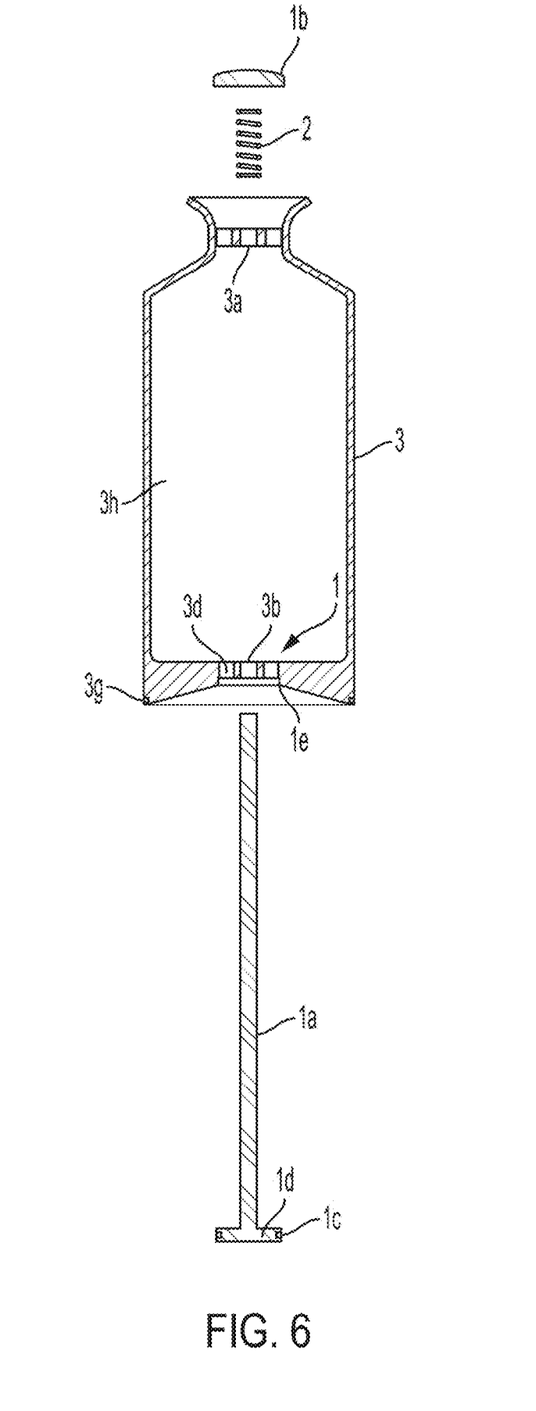
FIG. 6 shows an exploded view of the FIG. 1 piston.

As will be understood, if a seal is provided between the piston 3 and the container 4, the piston 3 can only move into or out of the container 4 to adjust a beverage storage volume if fluid is permitted to exit or enter the beverage storage volume as the piston 3 moves. In this embodiment, the piston 3 includes a valve 1 that permits flow of fluid (wine and/or air) from within the beverage storage volume to outside of the beverage storage volume as the piston 3 is advanced into the container 4. With the beverage storage volume suitably defined in size, e.g., to remove most or all air from the beverage storage volume, the valve 1 may close or be closed to prevent further movement of fluid (air or wine) into or out of the beverage storage volume. In this embodiment, as the piston 3 is inserted into the container 4, the valve 1 is opened to permit fluid to flow from the beverage storage volume and past the piston 3. The piston 3 may be inserted into the container 4 to a location where air in the beverage storage volume is minimized and the valve 1 closed, e.g., as shown in FIG. 2. In this embodiment, the valve 1 includes a valve rod 1a with a rod top 1b at a proximal or upper end of the rod 1a, and valve gate 1d with a seal 1c at a distal or lower end of the rod 1a, as depicted in FIG. 1. In this case, the rod 1a and rod top 1b may form a handle for the valve 1 that allows a user to operate the valve by manipulating the handle. Rod top 1b is preferably removable to allow assembly and disassembly of the valve 1 from the piston 3, e.g., for cleaning or replacement, as shown in FIG. 6. Removal of rod top 1b can be implemented in any of a variety of ways, such as using a threaded connection, latching, pinning, ball detent, etc. The seal 1c could be an o-ring as depicted, a conical or cup-shaped gasket with the concavity facing into the container 4, a washer-shaped gasket positioned between the gate 1d and the piston 3, or other sealing element known in the art. A spring 2 resiliently biases the rod 1a upwardly, urging the valve gate 1d to a closed position. Thus, a user may open the valve 1 by pushing downwardly on the rod top 1b against the bias of the spring, and the spring 2 may act to close the valve 1 once the user removes downward pressure from rod top 1b. The spring 2 could be a coil spring as depicted, or could be an elastic polymer sleeve that fits around rod 1a proximate to rod top 1b, or other suitable resilient member with enough spring force to cause the valve gate 1d to move from an open position to a closed position.

Figures 7, 8, 9:
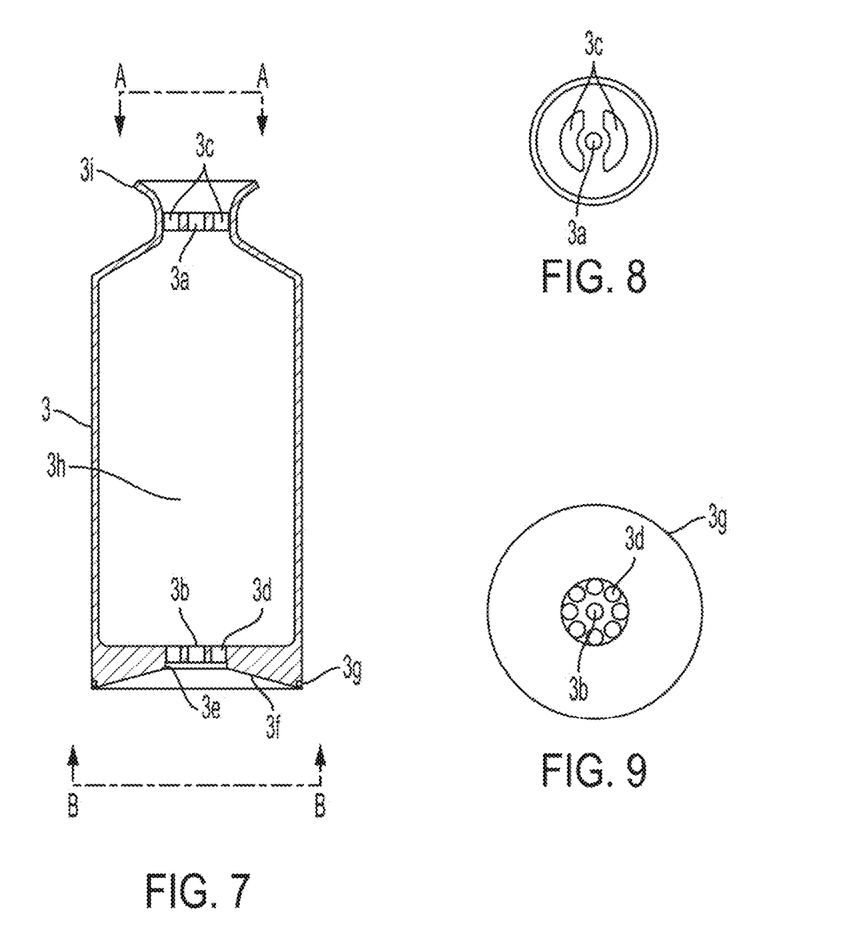
FIG. 7 shows a side view of the FIG. 1 piston.
FIG. 8 shows a bottom view of the FIG. 7 piston.
FIG. 9 shows a top view of the FIG. 7 piston.

In this embodiment, the piston 3 includes flow channels 3d which allow flow past the piston 3 when the valve 1 is open. Thus, air and/or wine may flow through the flow channels 3d with the valve 1 in an open position. The flow channels 3d may be seen in FIGS. 7 and 9. As the user applies downward force on rod top 1b, the spring 2 is compressed and seal 1c/valve gate 1d unseat from the valve seat 3e, exposing flow channels 3d. The rod 1a slides through, and is guided in motion by, channels 3a and 3b at the top and bottom of piston 3, respectively. The channels 3a and 3b may be seen in FIGS. 7-9. Unseating of the seal 1c and/or gate 1d allows fluid to flow from within container 4, through flow channels 3d and into a dispensing volume 3h as the piston 3 is advanced into the container 4 by downward pressure on the piston 3. In this embodiment, the flow channels 3d define a flow path through the piston 3, but the flow channels 3d may be formed in different ways, such as a single opening rather than multiple openings, and one or more flow channels or openings may have different shapes, be at different locations on the piston 3 (such as at the periphery), etc. That is, the flow channels 3d can be numerous and circular in cross section as depicted in FIG. 9, or can be of any of a variety of number and shapes such as arcuate, square, triangular, etc.

As will be appreciated, opening of the valve 1 and pressing downwardly on the piston 3 can force wine to flow past the piston and into the dispensing volume 3. In this embodiment, the piston 3 defines a dispensing volume 3h that can collect and hold wine in a space above the valve 1. However, in other embodiments, the dispensing volume 3h may be defined at least in part by the container 4, e.g., where the piston does not include a sidewall that extends upwardly from the lower piston portion that engages the container 4, or where such a piston sidewall includes one or more openings. Once the desired amount of wine has been moved from the beverage storage volume past the piston 3 and into the dispensing volume 4, the valve 1 may be closed, e.g., by releasing the rod top 1b and allowing the bias of the spring 2 to reseat the valve gate 1d and/or seal 1c at the closed position. With the valve 1 in the closed position, the seal 1c and/or the gate 1d seats against valve seat 3e of piston 3 and resists flow through the flow channels 3d, as shown in FIG. 2. Closure of the valve 1 may seal against further flow of wine from the beverage storage volume or ingress of air or other gas into beverage storage volume. As a result, a user may pour wine from the dispensing volume 3h, e.g., by tipping the decanter 10 so wine exits the dispensing volume 3h via the openings 3c at an upper portion of the piston 3. During this dispensing of wine from the dispensing volume 3h, wine in the beverage storage volume does not exit the storage volume because the valve 1 is closed. It is possible, though, that the valve 1 could be opened during this dispensing, allowing additional wine to exit the beverage storage volume. Once dispensing is complete, the decanter 10 may be placed in an upright position and the piston 3 moved downwardly into the container 4 as needed to reduce the size of the beverage storage volume to remove any air in the beverage storage volume as discussed above. In this embodiment, the bottom of the piston 3 which faces the beverage storage volume is frustro-conically shaped or otherwise downwardly and outwardly tapered with a narrower portion positioned near the valve 1 and a wider portion positioned downwardly and away from the valve 1. This encourages any air or gas within beverage storage volume to flow toward the valve ahead of any liquid, and thus exit the beverage storage volume as the piston 3 is moved into the container 4 to reduce the size of the beverage storage volume.

FIGS. 1, 2 and 10-12 depict usage of the decanter 10 in this illustrative embodiment. FIG. 1 depicts the container 4 after wine 5 has been provided into the container 4 by a user. Typically, wine 5 may be poured from a bottle directly into the container 4 without the piston 3 positioned in the container 4, but it is possible to first position the piston 3 in the container 4 and then pour wine 5 into the dispensing volume 3h. Wine 5 may be poured into the dispensing volume 3h either with the valve 1 open or closed. In some cases, pouring wine 5 into the dispensing volume 3h so the wine 5 passes through the valve 1 may aid in aeration of the wine 5, e.g., because the flow channels 3d break the wine flow up into multiple flow streams, increasing exposure of the wine to air. Once the desired amount of aeration has been achieved and wine 5 is located in the container 4, the piston 3 may be advanced into container 4 with the valve 1 open, e.g., with the spring 2 compressed and seal 1c/valve gate 1d unseated from valve seat 3e as shown in FIG. 2. This allows egress of any air 6 above wine 5 from within the beverage storage volume. Once the air has been evacuated to a desired degree, downward pressure on the piston 3 and rod top 1b can be released, allowing the valve 1 to close as shown in FIG. 2. If wine is initially poured into the dispensing volume 3h rather than directly into the container 4, the valve 1 may be opened and the piston moved (upwardly or downwardly, as required) to drain wine 5 into the beverage storage volume (as needed) and to enclose the wine 5 in the beverage storage volume with a desired air volume in the storage volume. The wine 5a in the beverage storage volume can be stored without further exposure to air due to the seals provided by the valve 1 and engagement of the piston 3 with the container 4.

Figure 10:
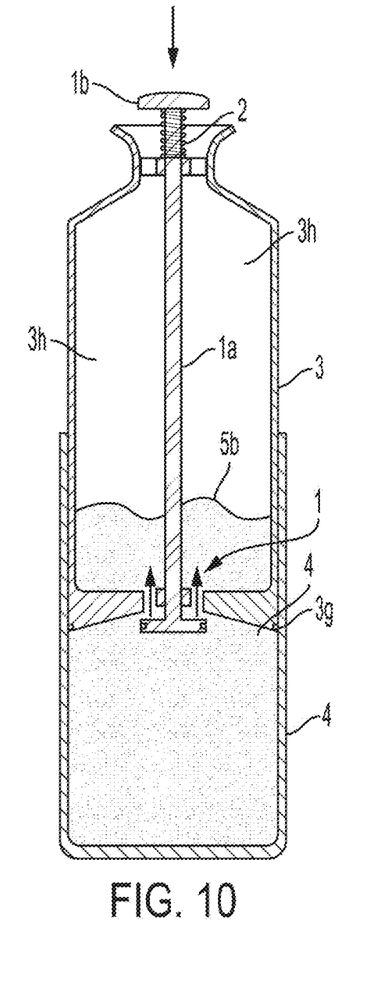
FIG. 10 shows the FIG. 1 embodiment while transferring beverage from the beverage storage volume to the dispensing volume.
Figure 11:
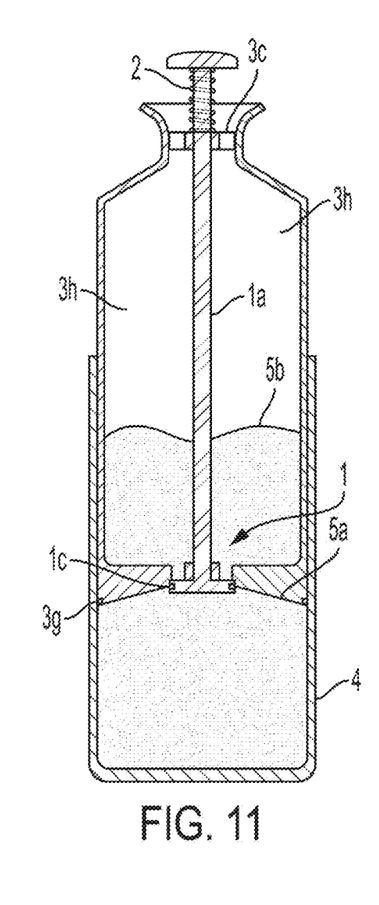
FIG. 11 shows the FIG. 1 embodiment with beverage located in the dispensing volume and the valve closed to isolate the beverage in the beverage storage volume.
Figure 12:
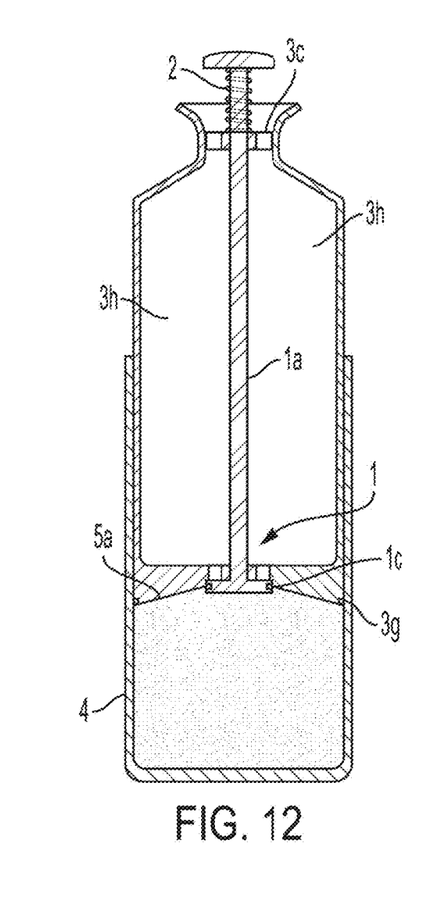
FIG. 12 shows the FIG. 11 embodiment with the beverage in the dispense volume removed.

When the user desires to dispense stored wine from decanter 4, e.g., from the condition shown in FIG. 2, the user can press downwardly on the piston 3 while having the valve 1 open, e.g., by pressing on the rod top 1b against the bias of the spring 2. This causes wine 5a in the beverage storage volume 5a to flow past the piston 3 and into the dispensing volume 5h as shown in FIG. 10. Once the desired amount of wine 5b has been transferred into dispensing volume 3h, the valve 1 is closed, e.g., by the user releasing pressure on rod top 1b, causing the valve 1 to close and preventing further egress of wine 5a from the beverage storage volume or ingress of air into the storage volume as depicted in FIG. 11. The user can then pour wine from dispensing volume 3h by tilting the decanter 10 over a user's glass or cup. Once the decanter 10 is tilted, wine 5b in the dispensing volume 3h can flow through pouring channels 3c located near rod top 1b. These flow channels 3c can be multiple and arcuate as depicted in the top down view in FIG. 8, or could be singular, or take any of a variety of preferred shapes. Wine 5b then flows over spout 3i, if present, into the user's glass or cup (not shown).

With wine or other beverage stored in the beverage storage volume, the beverage can be dispensed in quantities desired by the user over multiple occasions without exposure of the remaining wine in the beverage storage volume to ambient air. Once the user desires to consume the final quantity of wine sealed within beverage storage volume, the user can either advance piston 3 to the bottom of container 4 or the user can open the valve 1 while simultaneously pulling upward on piston 3. With upward force on the piston 3, air can flow into beverage storage volume, allowing the piston 3 to be withdrawn from container 4. With the remaining wine poured from the now open container 4, the container 4 and piston 3 can be cleaned for future use.

Figure 13:
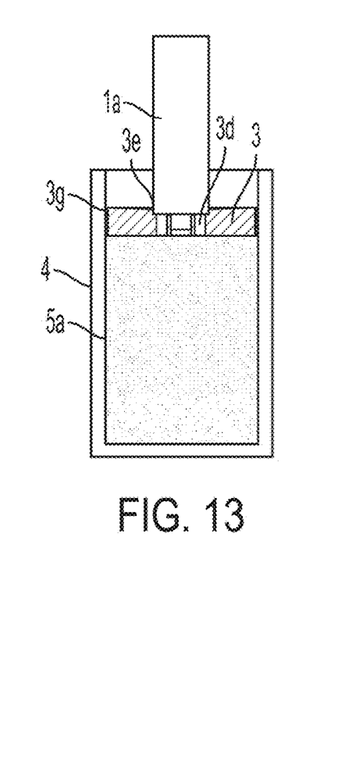
FIG. 13 shows another embodiment of a decanter.
Figures 14, 15:
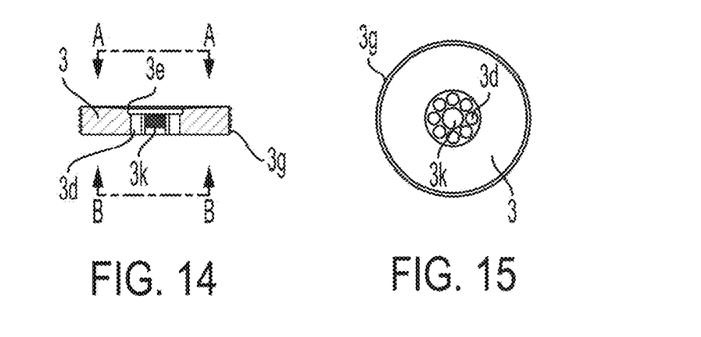
FIG. 14 shows a side view of the piston of the FIG. 13 embodiment.
FIG. 15 shows top view of the FIG. 14 piston.
Figures 16, 17:
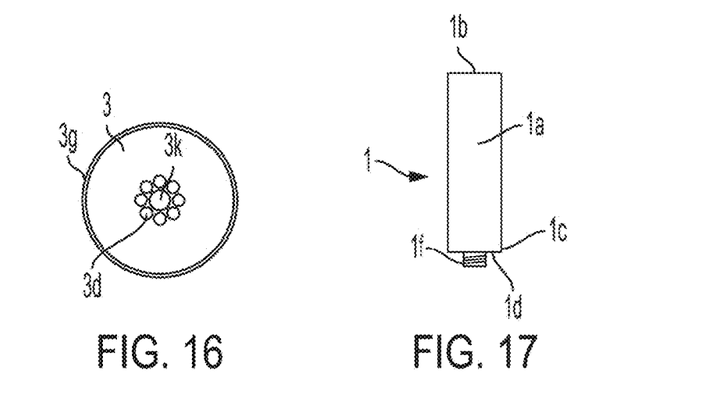
FIG. 16 shows a bottom view of the FIG. 14 piston.
FIG. 17 shows the valve arrangement of the FIG. 13 embodiment.
Figure 18:
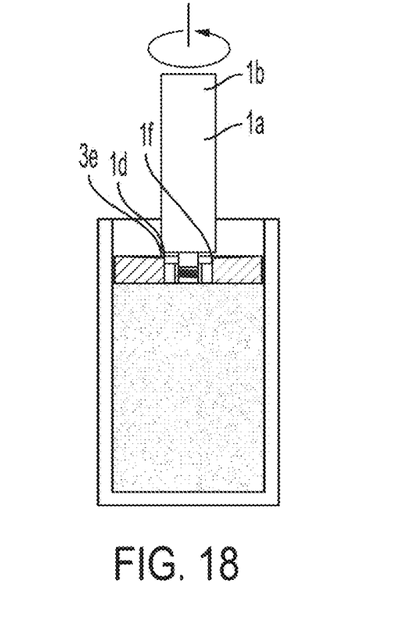
FIG. 18 shows the FIG. 13 embodiment while opening the valve.
Figure 19:
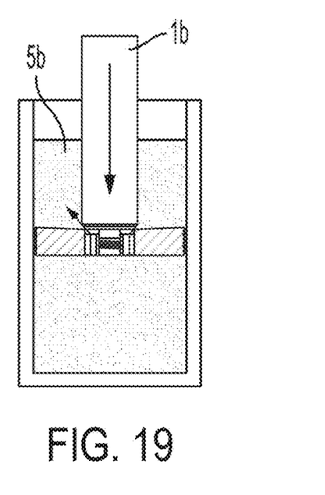
FIG. 19 shows the FIG. 13 embodiment while moving the piston to transfer beverage from the beverage storage volume to the dispensing volume.
Figure 20:
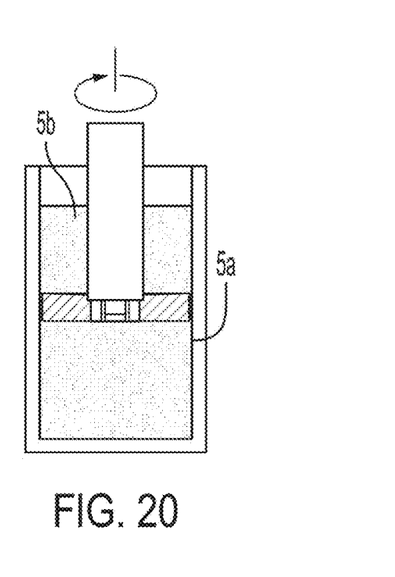
FIG. 20 shows the FIG. 19 embodiment while closing the valve.

It should be understood that the decanter 10 described above is only one illustrative embodiment, and that other arrangements for a decanter 10 that can operate to enclose a volume of wine or other beverage in a variable size storage volume are possible. As another example, FIG. 13 depict an alternative embodiment of a decanter 10. In this embodiment, the container 4 may be arranged as FIGS. 3-5, but the piston 3 is arranged as a generally flat disc, as can be seen in FIGS. 14-16. The piston 3 employs a baffled seal 3g as an alternative to one or more o-rings to create a seal with the inner wall of the container 4, but any of a number of potential seals could work for this application. For example, a conical gasket positioned with the larger diameter of the cone against the container inner wall and the smaller diameter affixed to the lower end of the piston 3 could also work. Such a gasket could allow for the piston 3 to be drawn upward relative to the container 4 without opening of any valve 1, e.g., because air or other fluid can flow past the conical gasket as the piston is drawn upwardly. As shown in FIGS. 15 and 16, the piston 3 has a multitude of circular flow channels 3*d*, as well as a valve seat 3*e* on the upper side of piston 3. The piston 3 also has threaded hole 3*k* that interacts with a threaded portion 1*f* of a rod 1*a* (a handle) of the valve 1 as depicted valve in FIG. 17. In this case, the valve 1 also includes an o-ring 1*c* and valve gate 1*d* arranged at a distal or lower end of the rod 1*a*. The o-ring 1*c* and/or valve gate 1*d* seats into the valve seat 3*e* of piston 3 to create a seal and close the valve 1. That is, as the rod 1*a* is rotated appropriately (e.g., clockwise viewing the rod 1*a* from the upper end 1*b*), the threaded portion 1*f* advances into the threaded hole 3*k* of the piston 3 until o-ring 1*c* and/or valve gate 1*d* seals against valve seat 3*e* to close the valve 1. As shown in FIG. 18, opening the valve is accomplished by rotating the rod 1*a* in the opposite direction (counterclockwise as viewed from the upper end 1*b*) so the threaded portion 1*f* moves the rod 1*a* relative to the piston 3 until o-ring 1*c*/valve gate 1*d* unseat from valve seat 3*e*. Opening of the valve 1 allows wine 5*b* in the beverage storage volume to flow through flow channels 3*d* and out of beverage storage volume as the piston 3 is advanced into container 4 by pressing down on upper surface 1*b* of rod 1*a* as shown in FIG. 19. With a desired amount of wine 5*b* moved from the beverage storage volume (below the piston 3) to the dispensing volume (above the piston 3), the rod 1*a* can then be threaded clockwise to advance the threaded portion 1*f* into the hole 3*k* to close the valve 1 by once again advancing o-ring 8*c* and/or valve gate 3*d* into engagement with the valve seat 3*e*, as shown in FIG. 20. This closes flow channels 3*d*, preventing further egress of wine 5*a* from the beverage storage volume or ingress of air into the storage volume. Wine 5*b* in the dispensing volume can then be poured from the upper portion of container 4 into a user's glass or cup, leaving the remaining wine 5*a* sealed against exposure to air or leakage of wine for later consumption.

Figure 21:
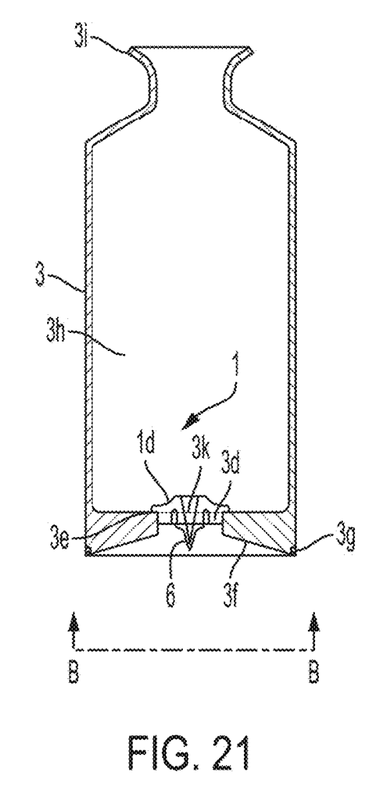
FIG. 21 shows yet another embodiment of a piston.
Figure 22:
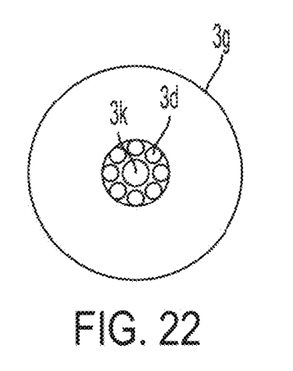
FIG. 22 shows a bottom view of the FIG. 21 piston.
Figure 23:
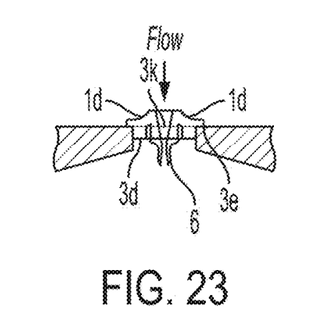
FIG. 23 shows the dual valve of the FIG. 21 embodiment while allowing flow into a beverage storage volume.
Figure 24:
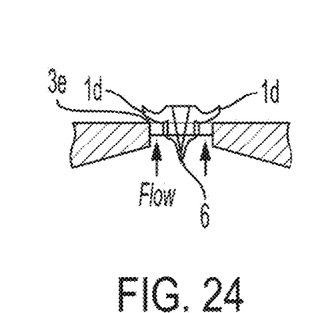
FIG. 24 shows the dual valve of the FIG. 21 embodiment while allowing flow from the beverage storage volume.

FIG. 21 depicts an alternative embodiment of the piston 3 that may be used, for example, in place of the piston 3 in the embodiment of FIG. 1. In this embodiment, the valve 1 includes a one-way valve that permits flow from the beverage storage volume past the piston 3, but resists flow into the beverage storage volume. This embodiment also includes a one-way valve 6 that permits flow into the beverage storage volume, but resists flow form the beverage storage volume past the piston 3. In this embodiment, a combined duckbill-umbrella valve functions as both valves 1 and 6 and is provided at the base of piston 3 to control flow into and out of the beverage storage volume. That is, the combined duckbill-umbrella valve provides both one-way valve features, i.e., the valve 1 that permits flow from or out of the beverage storage volume and the valve 6 that permits flow into the beverage storage volume. Of course, individual valves may be provided rather than employing a combined valve. In this embodiment, the combined duckbill-umbrella valve is constructed from a single piece of elastomer, and employs two functional one-way valves to create a two-way valve. The duckbill-umbrella valve depicted in FIG. 21 has a duckbill valve component 6 pressed into and a through hole 3*k* of the piston 3 (see FIG. 22) to secure the valve 1 in place. As can be seen in FIG. 24, as the piston 3 is pressed into the container 4, the valve gate 1*d* of the valve 1 opens to allow flow from the beverage storage volume through flow channels 3*d* of the piston 3. Once the user wishes to remove the piston 3 from the container 4, the piston 3 can be pulled upward, allowing air to flow through the open duckbill valve component 6 as shown in FIG. 23. When the piston 3 is resting within the container 4, both valves 1 and 6 are in a closed position as shown in FIG. 21, sealing the beverage storage volume from ingress of air or egress of wine.

While a few embodiments are described above having specific features, various containers, pistons, piston seals and valves may be employed to achieve the same outcome of dispensing and storing wine, e.g., after a desired level of aeration has been achieved. Various o-ring and gasket geometries could be employed in place of the o-rings and other seals described above, as well as non-circular cross sections for a valve rod 1*a*. In addition, any of a variety of different valves could be employed with the piston. Duck bill valves, ball valves, ball and spring valves, and poppet valves are just a few examples of valves that could be used to allow for wine to move from within the beverage storage volume to outside of the beverage storage volume when the piston is advanced into the container. Such valves may or may not require any activation by the user. The valves and advancement of the piston could alternatively be controlled digitally. The piston could be advanced by a downward force as shown in the depicted embodiments, or alternatively advancement of the piston could be actuated by a threading motion or a cam or lever. Various seals or gaskets could be employed to seal between the piston and container to achieve both sealing as well as allow various motions between the piston and container wall. It may be preferable in certain embodiments that the seal between piston and container allow removal of the piston from the container without opening of the valve. For example, the seal could be implemented with a gasket that is designed to bias against outward flow of wine or air from the container, but upon a certain force, does allow air to enter into the decanter. This could be achieved with a conical gasket, but could also be achieved by a secondary valve that releases once a certain vacuum level has been achieved in the beverage storage volume. While embodiments above are particularly useful for the storage of wine, the decanter could be used to prolong the storage and serving life of any of a variety of liquids.

Various markings can also be used on the decanter wall or other components to indicate both remaining stored volume of wine or the amount of wine poured from the decanter.

While the various preferred embodiments described filling the decanter by pouring wine into an open upper surface, it may be desirable to draw wine into the decanter without significant exposure to air. This could be achieved by adding a tube to the bottom of the container. Such a tube could have a length so as to reach the bottom of an open bottle of wine. By drawing the piston upward from full advancement into the decanter, wine could be then drawn into the decanter from the bottle with minimum exposure to air. In certain embodiments, this tube could be valved and/or detachable to allow for closure and/or removal of the tube to prevent ingress or egress of wine or air.

The invention claimed is:

1. A decanter, comprising:
a container having an internal volume arranged to hold a beverage;
a piston having a portion that is receivable in the internal volume of the container and movable relative to the container to define a beverage storage volume that is variable based on a position of the piston relative to the container; and
a valve coupled to the piston and configured to control flow of fluid past the piston to or from the beverage storage volume, the valve being arranged to allow beverage to flow from the beverage storage volume through the valve for dispensing to a user's cup.

2. The decanter of claim 1, wherein the piston is sealingly engaged with the container, and wherein sealing engagement between the piston and the container is maintained throughout a range of movement of the piston relative to the container.

3. The decanter of claim 1, wherein the container includes a cylindrical inner wall arranged to receive the portion of the piston and sealingly engage with the portion of the piston.

4. The decanter of claim 1, further comprising a seal between the container and the piston, the seal arranged to provide a fluid-tight sealing engagement between the piston and the container for a range of movement of the piston relative to the container.

5. The decanter of claim 4, wherein the seal includes one or more o-rings arranged to move with the piston relative to the container.

6. The decanter of claim 1, wherein the piston has a lower side that partially defines the beverage storage volume, the lower side of the piston having a downwardly and outwardly flared shape.

7. The decanter of claim 6, wherein the piston includes an opening that extends from the lower side of the piston to an upper side of the piston for fluid flow through the piston, the opening being located at an upper end of the downwardly and outwardly flared shape.

8. The decanter of claim 7, wherein the valve includes a gate that is arranged to sealingly engage with the piston so as to selectively open and close the opening for fluid flow.

9. The decanter of claim 8, wherein the valve gate includes a frusto-conically shaped portion arranged to engage with the piston to sealingly close the opening.

10. The decanter of claim 1, wherein the piston includes an opening that extends from a lower side of the piston to an upper side of the piston for fluid flow through the piston, and wherein the valve includes a movable gate to open and close the opening.

11. The decanter of claim 10, wherein the valve includes a handle operable to move the movable gate relative to the piston to open and close the opening.

12. The decanter of claim 11, wherein the handle is threadedly engaged with the piston such that rotation of the handle relative to the piston moves the movable gate relative to the piston.

13. The decanter of claim 11, wherein the valve includes a resilient element that biases the movable gate and the handle to a closed position in which the opening is closed to fluid flow through the piston, and wherein the handle is movable against a bias of the resilient element to move the movable gate to the open position.

14. The decanter of claim 1, wherein the piston and valve are arranged to allow movement of the piston relative to the container to reduce a size of the beverage storage volume and to force fluid flow out of the beverage storage volume through the valve in response to the movement of the piston relative to the container.

15. The decanter of claim 1, wherein the piston and valve are arranged to divide the internal volume of the container into the beverage storage volume on a first side of the piston and a dispensing volume on a second side of the piston opposite the first side.

16. The decanter of claim 15, wherein the piston and valve are arranged to allow movement of the piston relative to the container to reduce a size of the beverage storage volume and to force fluid flow out of the beverage storage volume through the valve and into the dispensing volume in response to the movement of the piston relative to the container.

17. The decanter of claim 16, wherein the piston and valve are arranged to allow movement of the piston relative to the container to reduce a size of the beverage storage volume and to force beverage to flow out of the beverage storage volume through the valve and into the dispensing volume, and wherein the valve is arranged to move to a closed position with beverage located in the dispensing volume.

18. The decanter of claim 17, wherein the container, piston and valve are arranged to allow pouring of the beverage from the dispensing volume and into a user's cup while the valve remains in the closed position and preventing fluid flow through the piston.

19. The decanter of claim 16, wherein the piston includes a cavity that defines the dispensing volume.

20. The decanter of claim 19, wherein the container, piston and valve are arranged to allow pouring of the beverage from the dispensing volume and into a user's cup.

21. The decanter of claim 1, wherein the container, piston and valve are arranged to hold beverage in the beverage storage volume, and to allow movement of the piston relative to the container to reduce a size of the beverage storage volume so as to evacuate gas from the beverage storage volume.

22. The decanter of claim 21, wherein the container, piston and valve are arranged to evacuate gas from the beverage storage volume such that a volume of gas in the beverage storage volume is less than 5% of a volume of beverage in the beverage storage volume.

23. The decanter of claim 1, wherein the valve includes a one-way valve that allows flow of fluid from the beverage storage volume through the piston.

24. The decanter of claim 23, further comprising a second one-way valve that allows flow of fluid past the piston and into the beverage storage volume.

25. The decanter of claim 1, further comprising a one-way valve that allows flow of fluid past the piston and into the beverage storage volume.

26. The decanter of claim 24, wherein the second one-way valve is a duckbill valve.

* * * * *